Oct. 10, 1950  C. E. ANDERSON ET AL  2,525,193

CHAIN LINK

Filed May 1, 1946

INVENTORS
CARLOS E. ANDERSON
CHARLES E. SENNHOLTZ
BY
Carlson, Pitzner, Hubbard & Wolfe
ATT'YS Patented Oct. 10, 1950

2,525,193

UNITED STATES PATENT OFFICE 2,525,193

CHAIN LINK

Carlos E. Anderson and Charles E. Sennholtz, Chicago, Ill.

Application May 1, 1946, Serial No. 666,392

2 Claims. (Cl. 59—84)

1

The present invention relates generally to improvements in link chains adapted for heavy duty service, such, for example, as chains commonly employed for ship anchors and drag line excavator buckets, and has particular reference to a new and improved design of the interengaging chain links.

One of the objects of the present invention is to provide a novel chain link which for a given size is exceptionally strong and particularly resistant to wear and shock.

A further object is to provide a novel chain link having openings at opposite ends which are shaped to guide the ends of the interconnected links expeditiously into end bearing engagement upon the application of a longitudinal pull on the chain, thereby avoiding kinking and tangling.

Another and more specific object is to provide a new and improved chain link having opposite end openings for the reception of contiguous links which provide ample space or clearance for casting the links initially in a chain series.

In general, one of the primary and more specific objects of the invention is to provide a novel chain link of a sectional design in which the metal stock is provided where most needed, i. e., where the most wear ordinarily occurs, so as to obtain maximum strength and maximum life.

Other objects and advantages will become apparent as the description proceeds.

Referring more particularly to the drawings, the chain link constituting the exemplary embodiment of the invention comprises a continuous oblong loop of integral construction having side bars 6 connected by curved ends 7. Preferably, the side bars 6 are additionally connected and reinforced by an intermediate transverse tie bar or strut 8 bisecting the open area circumscribed by the loop. When provided, the tie bar or strut 8 serves to define two openings 9 and 10 at opposite ends of the link for receiving the curved ends 7 of the adjoining links.

When a series of the links are interconnected to form a chain, as fragmentarily illustrated in

2

Figure 1:
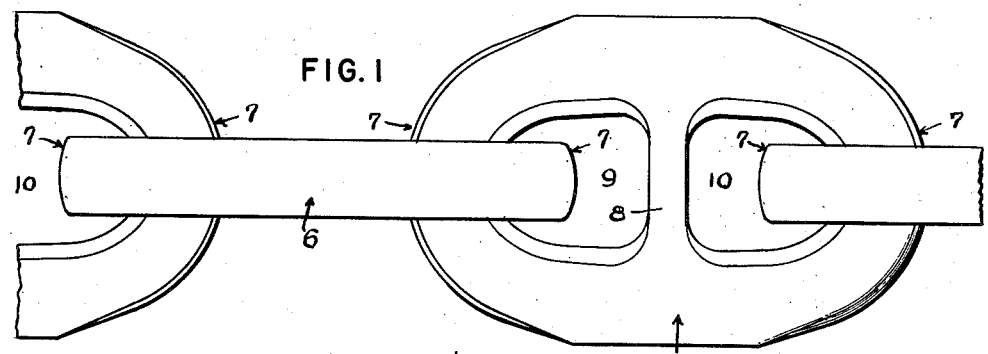
Fig. 1 is a fragmentary view of a portion of the chain having interconnected links, each embodying the features of the present invention.

Fig. 1, the curved ends of the adjoining links are disposed in direct bearing engagement upon the application of a longitudinal pull, and are adapted for relative angular movement, each about the other, respectively, in mutually perpendicular directions. For heavy duty chains, the links are usually cast as integral structures and with their curved ends in interconnected relationship. Hence, the links must have sectional forms and be so shaped and dimensioned that ample clearance is provided between the adjacent surfaces thereof to afford the necessary sand room in the casting operation. One of the important objects of the present invention is to provide the metal stock where it is most needed so as to obtain maximum strength and the longest possible life for a given size, and, at the same time, provide adequate clearance for sand room, particularly between the curved ends 7.

Figures 2, 3:
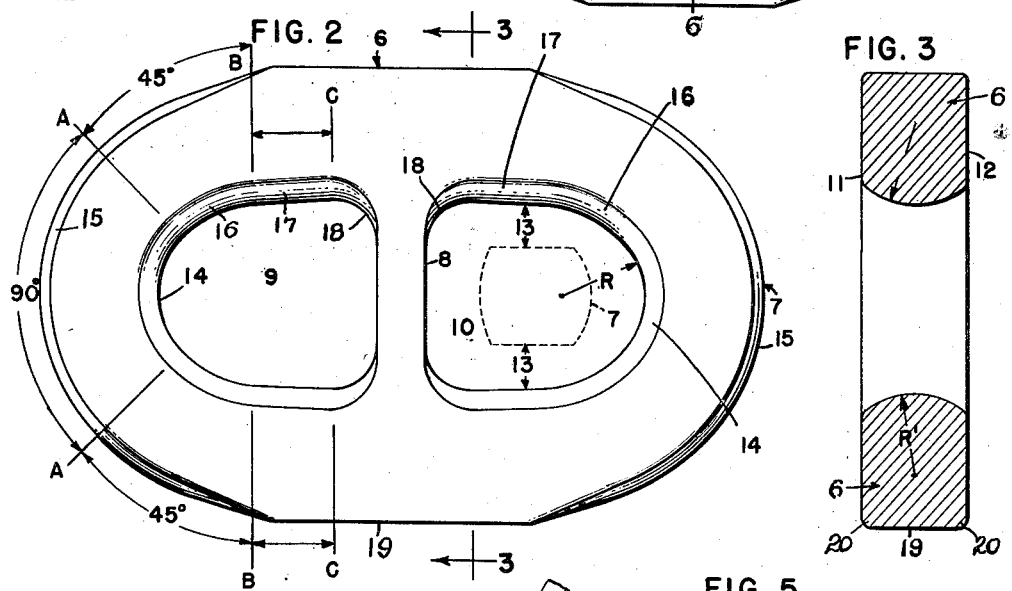
Fig. 2 is a face view, on an enlarged scale, of one of the chain links.
Fig. 3 is a transverse sectional view of the link taken along line 3—3 of Fig. 2.
Figures 4, 5:
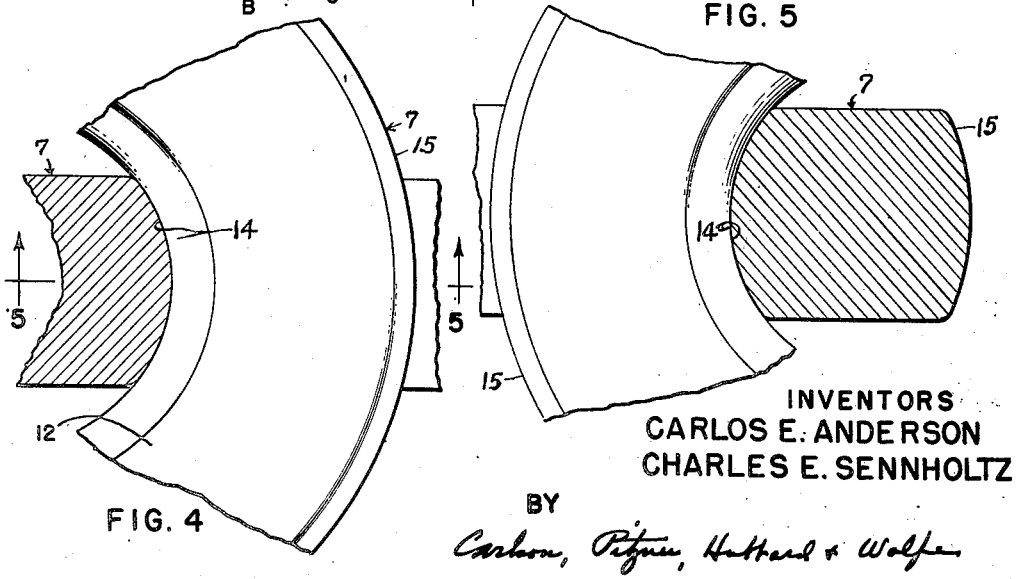
Fig. 4 is an enlarged fragmentary sectional view illustrating the bearing contact between two interconnected links in the medial plane of one of said links.
Fig. 5 is a view similar to Fig. 4, but taken along 5—5 of Fig. 4 to illustrate the bearing contact between the links in the medial plane of the other of the links.

The link is formed with flattened parallel side faces 11 and 12. As a result, the flat sides of the curved ends 7 of each link can be adequately spaced from the inner surfaces of the side bars 6 of the adjoining links to provide the necessary sand room 13. The length of the openings 9 and 10 is such that the actual cross-sectional area of the curved ends 7 can be made comparatively wide, as indicated in dotted outline in Fig. 2. If the transverse form of the curved ends 7 were circular, the permissible sectional area would be considerably less.

The curved ends 7 are formed with inner bearing surfaces 14 which are symmetrically arcuate about equal radii R and R' both in the general plane of the link and in any radial plane perpendicular thereto through the center of transverse curvature.

The curved ends 7 also are formed with outer surfaces 15 which are likewise arcuate, and preferably described about the same center as the surfaces 14 in the general plane of the link. The surfaces 15 are not required to bear against any other portions of the adjoining links, but are normally exposed to extraneous wear in rough usage of the chain. Hence, it is desirable to provide the surfaces 15 with additional metal at the outer edges. The transverse shape of these surfaces, therefore, may be more nearly square and, in the present instance, are shown as struck on an arc which is larger than that of the surfaces 14 in all radial planes normal to the general plane of the link. This is particularly desirable since the chains are more likely to fail when subjected to a heavy pull because of the tension load at the outer surfaces 15 than because of the compression load at the inner surfaces 14.

One of the primary features of the invention is to so shape the openings 9 and 10 in the link that when the chain is tightened, the side bars 6 will tend to guide the curved ends 7 directly into centered bearing engagement. To this end, the inner arcuate surfaces 14 are formed with a relatively small radius, and extend only along a short arcuate segment A—A of the link, for example through 90°, corresponding approximately to the thickness between opposite faces 11 and 12, thereby narrowing the outer end portions of the openings. From and beyond the opposite ends of the arcuate segments A—A, the adjoining portions 16 of the sides of the openings 9 and 10 continue to diverge inwardly, and preferably are arcuate in form along segments A—B in the general plane of the link, while the transverse curvature remains the same as that of the surface 14. The arcuate side portions 16 are eccentric to the surfaces 14 and in each instance struck on a longer radius located at one side or the other of the longitudinal medial axis of the link. In the present instance, each of the arcuate segments A—B of the link extends through approximately 45°. The outer surfaces of the curved ends 7 beyond the segment A—A preferably are concentric to and coextensive with the surfaces 16 in the general plane of the link.

From and beyond the arcuate segments A—B, the inner portions of the sides of the openings 9 and 10 still continue to diverge in the general plane of the link along sections B—C, but at a lesser degree than the segments A—B. The sections B—C may have any desired inside contour, and in the present instance are shown as formed of straight-line longitudinal elements. Here again, the transverse curvature may remain the same as that of the surfaces 14. At the extreme inner ends of the sections B—C, the sides of the openings 9 and 10 are connected through rounded corners 18 to the sides of the tie bar 8. In general, sharp corners are avoided throughout the link in order to eliminate the tendency which such corners have to develop cracks. By reason of the special shape of the openings 9 and 10, the inner side surfaces 17 and 16 converge from adjacent the tie bar 8 continuously and at an increasing rate outwardly toward the comparatively narrow end bearing surface 14, and hence tend to cam or direct the interconnected arcuate ends 7 immediately into engagement whenever the chain is tightened longitudinally.

The outside curved surfaces of the ends of the link, from the segments A—B, run out and merge into the side bars 6. These side bars are normally not in bearing contact with any portion of the adjoining links, but are exposed to extraneous wear in rough usage of the chain. Consequently, the side bars 6 preferably are formed with flat outside surfaces 19 and square corners 20 to provide extra metal at the marginal edges, thereby increasing the cross-sectional area to obtain greater strength and durability.

It will be evident that we have provided a new and improved chain link which for a given size and weight has a large cross sectional area through the side bars and ends, and which is provided with added metal where most needed to improve the strength and durability of the chain. The opposite end openings 9 and 10 are so shaped that ample sand room 13 is provided without impairing the strength of the link, and that the slack in the chain is readily taken up without any tendency of the links to kink.

We claim as our invention:

1. A chain link in the form of a closed elongated loop having parallel side bars, curved opposite link ends, and a transverse tie bar connecting said side bars, the inner surface of each of said ends in the general medial plane of said link being concavely curved symmetrically along a central arc struck on a relatively short radius on a predetermined center and extending through approximately 90° and being transversely convexly curved in any radial plane through said center on a radius substantially equal to said first mentioned radius, and then being curved at opposite ends of said central arc along contiguous arcs struck in said medial plane on equal radii longer than said first mentioned radius and each extending approximately through 45°, the outer surface of each link end being curved in said medial plane about said center and being transversely convexly curved in any radial plane through said center on a radius longer than said first mentioned radius, the inner surfaces of said side bars in said medial plane of said link being oppositely and equally inclined to diverge uniformly from said contiguous arcs in a medial direction toward the center portion of said link, said loop having flat parallel opposite faces extending substantially throughout said side bars, link ends and tie bar, said side bars having flat outer sides and substantially square outer corners and transversely convexly curved inner sides, the thickness of said link being substantially equal to the chord subtended by said central arc.

2. A chain link in the form of a closed elongated loop having parallel side bars and curved opposite link ends, the inner surface of each of said ends in the general medial plane between the opposite faces of said link being concavely curved symmetrically along a central arc struck on a relatively short radius, and then being curved at opposite ends of said arc along contiguous arcs struck in said plane on equal radii longer than said first mentioned radius, the inner surfaces of said side bars in said plane of said link from said contiguous arcs being oppositely and equally inclined to diverge uniformly from said contiguous arcs in a medial direction toward the center portion of said link, the thickness of said link being substantially equal to the chord subtended by said central arc, said inner surfaces of said ends and side bars being curved convexly transversely, the outer surface of each of said ends in the transverse plane of said link being concentric to said central arc, and in all radial planes through the center of said central arc perpendicular thereto being convexly curved along an arc on a radius longer than said first mentioned radius, the outer sides of said bars being substantially flat and formed with substantially square corners.

CARLOS E. ANDERSON.
CHARLES E. SENNHOLTZ.

REFERENCES CITED

The following references are of record in the file of this patent:

UNITED STATES PATENTS

| Number | Name | Date |
|---|---|---|
| 2,103,972 | Harris | Dec. 28, 1937 |

FOREIGN PATENTS

| Number | Country | Date |
|---|---|---|
| 1,013 | Great Britain | Jan. 15, 1900 |
| 318,378 | France | Oct. 15, 1902 |